United States Patent
Li et al.

(10) Patent No.: US 6,636,895 B1
(45) Date of Patent: Oct. 21, 2003

(54) SYSTEM, DEVICE, AND METHOD FOR DISTRIBUTING MULTICAST ROUTING INFORMATION IN A PROTOCOL INDEPENDENT MULTICAST NETWORK

(75) Inventors: Yunzhou Li, Lowell, MA (US); Billy C. Ng, Revere, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/416,989

(22) Filed: Oct. 13, 1999

(51) Int. Cl.$^7$ ............................................. G06F 15/173
(52) U.S. Cl. ........................ 709/238; 709/239; 709/240; 709/243; 709/244; 370/351
(58) Field of Search ................................. 709/238, 239, 709/240, 243, 244; 370/351

(56) References Cited

U.S. PATENT DOCUMENTS 6,055,561 A * 4/2000 Feldman et al.
6,069,889 A * 5/2000 Feldman et al.
6,321,270 B1 * 11/2001 Crawley
6,343,326 B2 * 1/2002 Acharya et al.

OTHER PUBLICATIONS

Estrin et al., Internet Engineering Task Force (IETF) Request for Comments (RFC) 2362, Protocol Independent Multicast—Sparse Mode (PIM–SM): Protocol Specification, Jun. 1998.

Deering et al., Internet Engineering Task Force (IETF) Internet Draft draft–ietf–pim–v2–dm–03.txt, Protocol Independent Multicast Version 2 Dense Mode Specification, Jun. 7, 1999.

Bates et al., Internet Engineering Task Force (IETF) Request for Comments (RFC) 2283, Multiprotocol Extensions for BGP–4, Feb. 1998.

Farinacci et al., Internet Engineering Task Force (IETF) Internet Draft draft–farinacci–msdp–00.txt, Multicast Source Discovery Protocol (MSDP), Jun. 25, 1998.

Thaler et al., Internet Engineering Task Force (IETF) Internet Draft draft–ietf–idmr–gum–04.txt, Border Gateway Multicast Protocol (BGMP): Protocol Specification, Nov. 1998.

Li, Y., Internet Engineering Task Force (IETF) Internet Draft draft–ietf–msdp–server–00.txt, Group Specific MSDP Peering, Jun. 4, 1999.

* cited by examiner

*Primary Examiner*—Hosain T. Alam
*Assistant Examiner*—Young N. Won
(74) *Attorney, Agent, or Firm*—John C. Gorecki

(57) ABSTRACT

A system, device, and method for distributing multicast routing information in a Protocol Independent Multicast (PIM) domain utilizes a PIM router in the PIM domain to collect and distribute multicast routing information. The PIM router collects interdomain multicast routing information from border routers, and distributes the interdomain multicast routing information by periodically sending a bootstrap message containing the interdomain multicast routing information. The PIM router may also send a bootstrap message containing any changed interdomain multicast routing information upon determining that one or more interdomain multicast routes have changed.

22 Claims, 10 Drawing Sheets

SYSTEM, DEVICE, AND METHOD FOR DISTRIBUTING MULTICAST ROUTING INFORMATION IN A PROTOCOL INDEPENDENT MULTICAST NETWORK

FIELD OF THE INVENTION

The present invention relates generally to communication systems, and more particularly to distributing multicast routing information in a protocol independent multicast network.

BACKGROUND OF THE INVENTION

In today's information age, communication networks are often used for transporting information from an information provider to one or more information consumers.

One technique for transporting information from an information provider to a group of information consumers over the communication network is known as "multicasting." Multicasting allows the information provider (referred to hereinafter as a "multicast source") to transmit a single unit of multicast information (referred to hereinafter as a "multicast packet") simultaneously to all information consumers (referred to hereinafter individually as a "multicast client" and collectively as "multicast clients") in the multicast group, specifically by addressing the multicast packet to the multicast group using a multicast address. The multicast clients monitor the communication network for multicast packets addressed to the multicast group.

In order to distribute multicast packets from a particular multicast source S to the multicast clients for a particular multicast group G, the multicast packet is routed through the communication network by a number of routers. The communication network may include multiple routing domains, and therefore the multicast packet may traverse multiple routing domains. Each router runs various routing protocols to determine, among other things, a "next hop" for each packet based upon address information in the packets. Such routing information is used to establish a multicast distribution tree, and is maintained by each router in one or more routing tables (often referred to as a "routing information base"). In particular, each router maintains a unicast routing information base (URIB) that is used to determine the "next hop" for unicast packets. Also, each multicast router maintains a multicast routing information base (MRIB) that is used to determine the "next hop" for multicast packets. Upon receiving a packet, the router uses the appropriate routing information base to determine the "next hop" router for the packet.

One well-known protocol for routing multicast packets within a multicast routing domain is known as Protocol Independent Multicast (PIM). PIM is so named because it is not dependent upon any particular unicast routing protocol for setting up a multicast distribution tree within the multicast routing domain. PIM has two modes of operation, specifically a sparse mode and a dense mode. PIM Sparse Mode (PIM-SM) is described in the document Internet Engineering Task Force (IETF) Request For Comments (RFC) 2362 entitled *Protocol Independent Multicast-Sparse Mode (PIM-SM): Protocol Specification* and published in June 1998, hereby incorporated by reference in its entirety. PIM Dense Mode (PIM-DM) is described in an Internet Draft of the Internet Engineering Task Force (IETF) entitled *Protocol Independent Multicast Version 2 Dense Mode Specification*, document draft-ietf-pim-v2-dm-03.txt (Jun. 7, 1999), hereby incorporated by reference in its entirety In accordance with the PIM protocol, the various routers within a particular PIM domain establish a default multicast distribution tree, referred to as a "shared tree," for each multicast group. Each shared tree is rooted at a Rendezvous Point (RP) router that acts as the distribution point of all multicast packets for the multicast group. Before a router can join the shared tree for a particular multicast group, the router must learn the identity of the multicast group RP router. A router learns the identity of the multicast group RP router by receiving a PIM Bootstrap Message including a list of all RP routers in the PIM domain. The router receives the PIM Bootstrap Message either from a Bootstrap Router (BSR), which sends the PIM Bootstrap Message to all routers in the PIM domain at predetermined intervals (typically every 60 seconds), or from a neighboring router, which sends the PIM Bootstrap Message to the router if and only if the neighboring router has lost contact with the router for a predetermined period of time (typically 105 seconds). Upon learning the identity of the multicast group RP router, or at any time thereafter, each router that supports a downstream multicast group member (i.e., multicast client) joins the shared tree by sending a PIM Join/Prune Message hop-by-hop toward the multicast group RP router. Each intermediate router that receives the PIM Join/Prune Message from a downstream router also joins the shared tree by forwarding the PIM Join/Prune Message toward the multicast group RP router.

The PIM domain may have a number of source networks that belong to the PIM domain itself. Multicast packets that originate within such intradomain source networks are not routed to other PIM domains. The routes associated with such intradomain source networks (referred to hereinafter as intra-source routes) are distributed by a unicast routing protocol and maintained in the URIB.

In order to route the multicast packet between PIM domains, border routers in each PIM domain (each referred to hereinafter as a Multicast Border Gateway Protocol or MBGP router) determine interdomain routes (referred to hereinafter as MBGP routes) for the (source, group) pair. The MBGP router is typically a Multicast Source Discovery Protocol (MSDP) router or a PIM Multicast Border Router (PMBR) that functions as a Border Gateway Protocol (BGP) router to receive and install MBGP routes. MSDP, PMBR, and BGP are described in IETF documents and are well-known in the art. The MBGP routes need to be distributed to all PIM routers in the PIM domain so that all PIM routers will have consistent routing information.

One way to distribute the MBGP routes to the PIM routers in the PIM domain is to manually configure each PIM router to include the MBGP routes. Such manual configuration is a significant burden on the network administrator, and is therefore not a viable approach. Another way to distribute the MBGP routes to the PIM routers in the PIM domain is using any of a number of interior routing protocols, including, but not limited to, Interior Border Gateway Protocol (IBGP), Routing Information Protocol (RIP), and Open Shortest Path First (OSPF). These interior routing protocols have certain drawbacks, and are therefore not viable alternatives. Yet another way to distribute the MBGP routes to the PIM routers in the PIM domain is using a multicast routing protocol such as Distance Vector Multicast Routing Protocol (DVMRP). Unfortunately, such a multicast routing protocol may not be in use within the PIM domain.

Thus, a need remains for a system, device, and method for distributing MBGP routes to all of the PIM routers in the PIM domain.

SUMMARY OF THE INVENTION

In accordance with one aspect of the invention, a PIM router distributes MBGP routes over the PIM domain by opening a TCP connection to each MBGP router, obtaining the MBGP routes from the MBGP routers using IBGP, and sending a bootstrap message including the MBGP routes. In a preferred embodiment, the PIM router periodically sends a bootstrap message including all MBGP routes, and also sends a bootstrap message including only changed MBGP routes whenever the PIM router detects a MBGP route change. The bootstrap messages are propagated to all PIM routers in the PIM domain.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

An embodiment of the present invention distributes MBGP routes to all PIM routers in the PIM domain by selecting a Bootstrap Router (BSR) to collect and distribute the MBGP routes. The BSR obtains MBGP routes from the MBGP routers in the PIM domain. The BSR distributes the MBGP routes and the policy routes by sending bootstrap messages periodically and whenever routes change. In a preferred embodiment, the BSR distributes the MBGP routes using a special MBGP Bootstrap message. The MBGP Bootstrap message is similar to the PIM Bootstrap message that is used for propagating RP information to the PIM routers in the PIM domain, but carries MBGP routes instead.

More specifically, the BSR functions as an IBGP router. As such, the BSR opens a Transmission Control Protocol (TCP, a well-known internetworking protocol) connection to each MBGP router in the PIM domain, and uses BGP mechanisms to obtain MBGP routes from the MBGP routers. The BSR distributes the MBGP routes to all PIM routers in the PIM domain by periodically sending a MBGP Bootstrap message including the MBGP routes. Also, whenever the BSR determines that one or more MBGP routes have changed, the BSR distributes the changed MBGP route(s) to all PIM routers in the PIM domain by sending a MBGP Bootstrap message including only the changed MBGP route (s). The preferred MBGP Bootstrap message includes a Change bit to indicate whether the MBGP Bootstrap message includes a list of all MBGP routes or only MBGP routes that have changed. The BSR sends the MBGP Bootstrap messages to each of its neighboring PIM routers. Each PIM router in turn sends the MBGP Bootstrap message to each of its neighboring PIM routers, so that the MBGP Bootstrap messages are propagated to all PIM routers in the PIM domain.

Figure 1A:
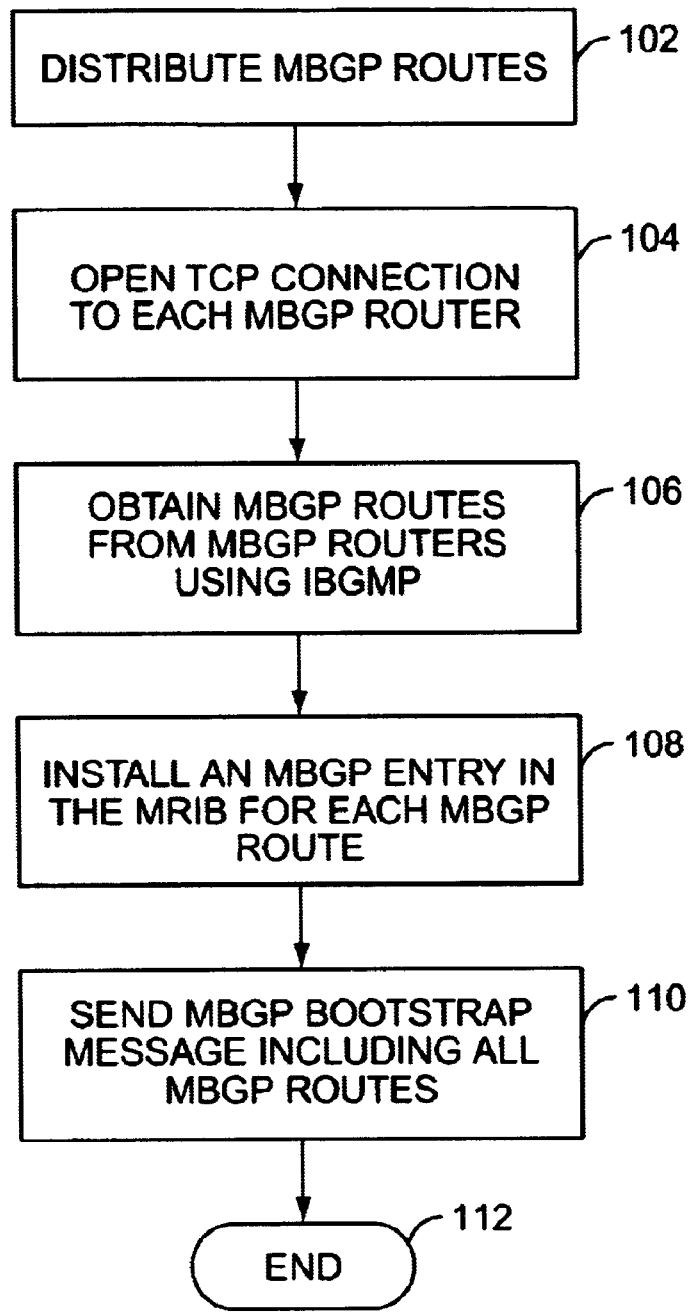
FIG. 1A is a logic flow diagram showing exemplary logic for distributing all MBGP routes in a PIM domain in accordance with an embodiment of the present invention.

FIG. 1A is a logic flow diagram showing exemplary logic for distributing all MBGP routes in a PIM domain. Beginning in step 102, the logic first opens a TCP connection to each MBGP router in the PIM domain, in step 104. The logic then obtains MBGP routes from the MBGP routers using IBGMP, in step 106. The logic installs a MBGP entry in the MRIB for each MBGP route, in step 108. The logic then sends a MBGP Bootstrap message including all MBGP routes to all neighboring PIM routers, in step 110. Thereafter, the logic periodically sends a MBGP Bootstrap message including all MBGP routes to all neighboring PIM routers so that any newly activated PIM router will receive the MBGP routes. The logic terminates in step 112.

Figure 1B:
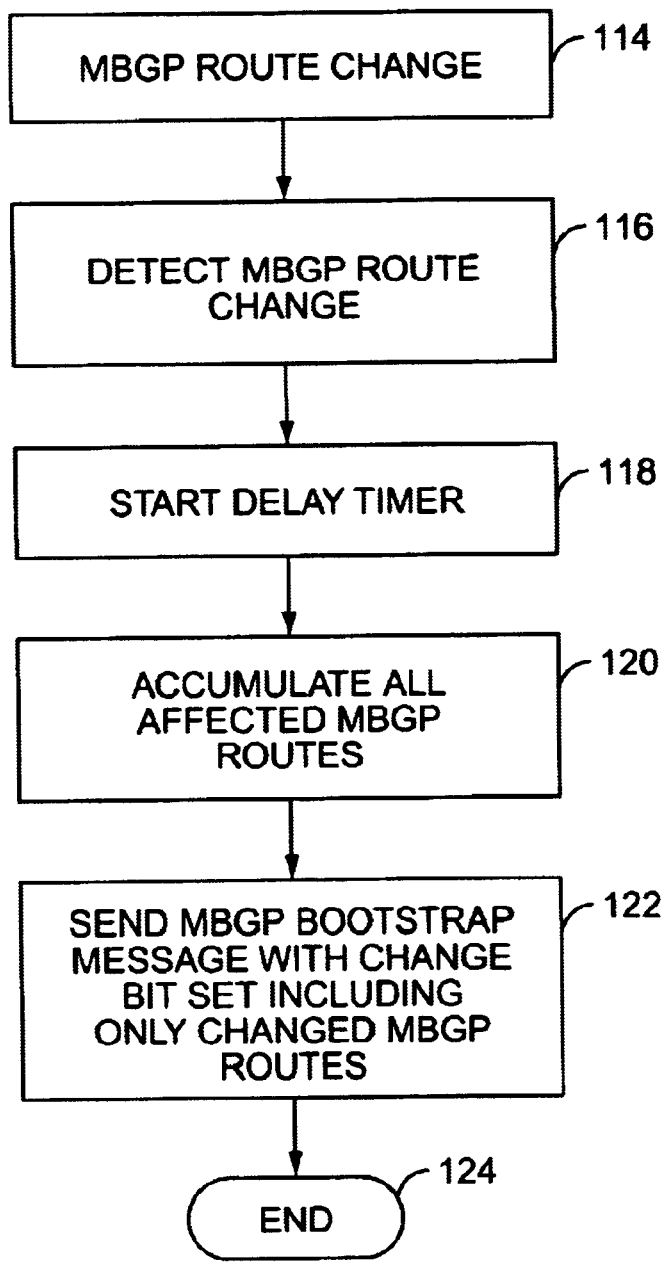
FIG. 1B is a logic flow diagram showing exemplary logic for distributing changed MBGP routes in a PIM domain in accordance with an embodiment of the present invention.

FIG. 1B is a logic flow diagram showing exemplary logic for distributing changed MBGP routes in a PIM domain. Beginning in step 114, and upon detecting a MBGP route change, in step 116, the logic preferably starts a delay timer, in step 118, and accumulates all MBGP routes that change within the delay timer, in step 120. A changed MBGP route can be a new MBGP route, an existing MBGP route that changed from one MBGP router to another, or an existing MBGP route that has become obsolete (i.e., aged). The logic then sends a MBGP Bootstrap message with the Change bit set including only the changed MBGP routes, in step 122. The delay timer allows the logic to accumulate all affected MBGP routes and send all affected MBGP routes in a single MBGP Bootstrap message rather than sending a separate MBGP Bootstrap message for each affected MBGP route. The logic terminates in step 124.

Figure 1C:
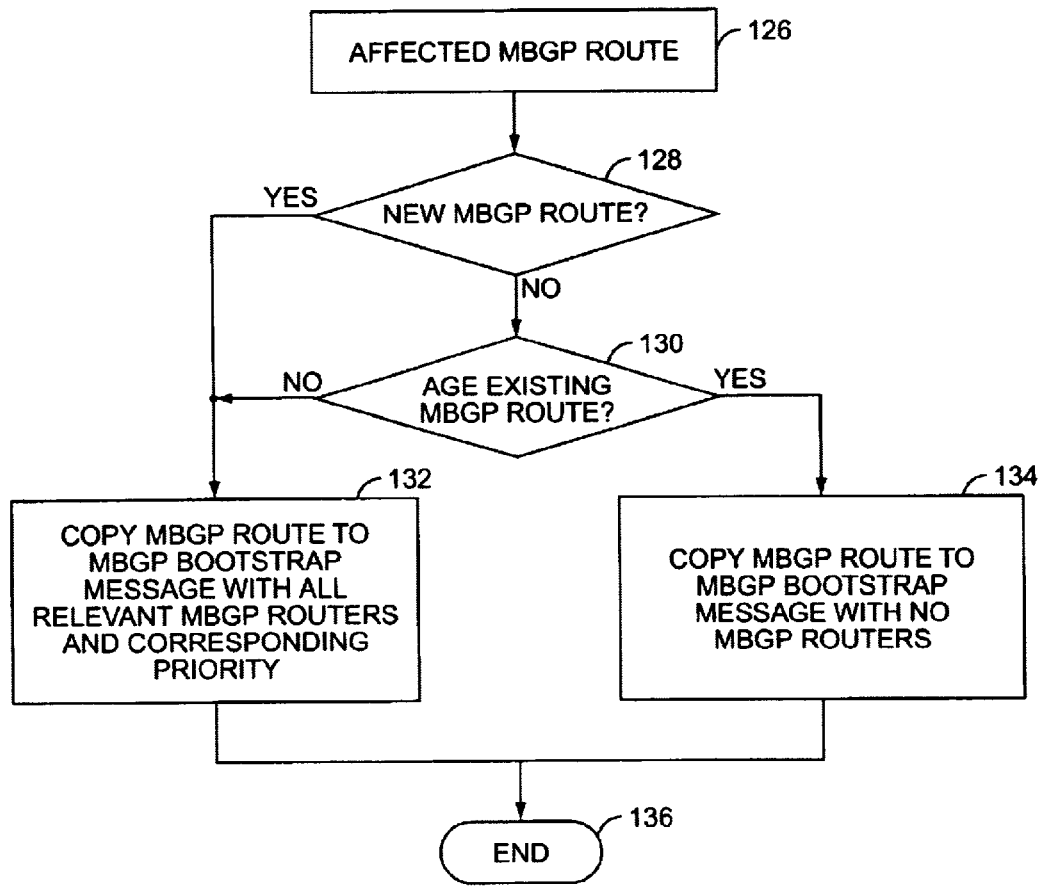
FIG. 1C is a logic flow diagram showing exemplary logic for processing a changed MBGP route in accordance with an embodiment of the present invention.

In order to format the MBGP Bootstrap message for distributing changed MBGP routes, the logic processes each changed MBGP route as shown in FIG. 1C. Beginning in step 126, the logic first determines whether the MBGP route is a new MBGP route, in step 128. If the MBGP route is a new MBGP route (YES in step 128), then the logic copies the MBGP route to the MBGP Bootstrap message with all relevant MBGP router and corresponding priority, in step 132. If the MBGP route is not a new MBGP route (NO in step 128), then the logic determines whether the MBGP route is an existing MBGP route that changed from one MBGP router to another or an existing MBGP route that has become obsolete (i.e., aged), in step 130. If the MBGP route is an existing MBGP route that changed from one MBGP router to another (NO in step 130), then the logic copies the MBGP route to the MBGP Bootstrap message with all relevant MBGP router and corresponding priority, in step 132. If the MBGP route is an existing MBGP route that has become obsolete (YES in step 130), then the logic copies the MBGP router to the MBGP Bootstrap message with no MBGP routers, in step 134, thereby indicating that the MBGP route is no longer associated with any MBGP router and can be deleted. The logic terminates in step 136.

Figure 2:
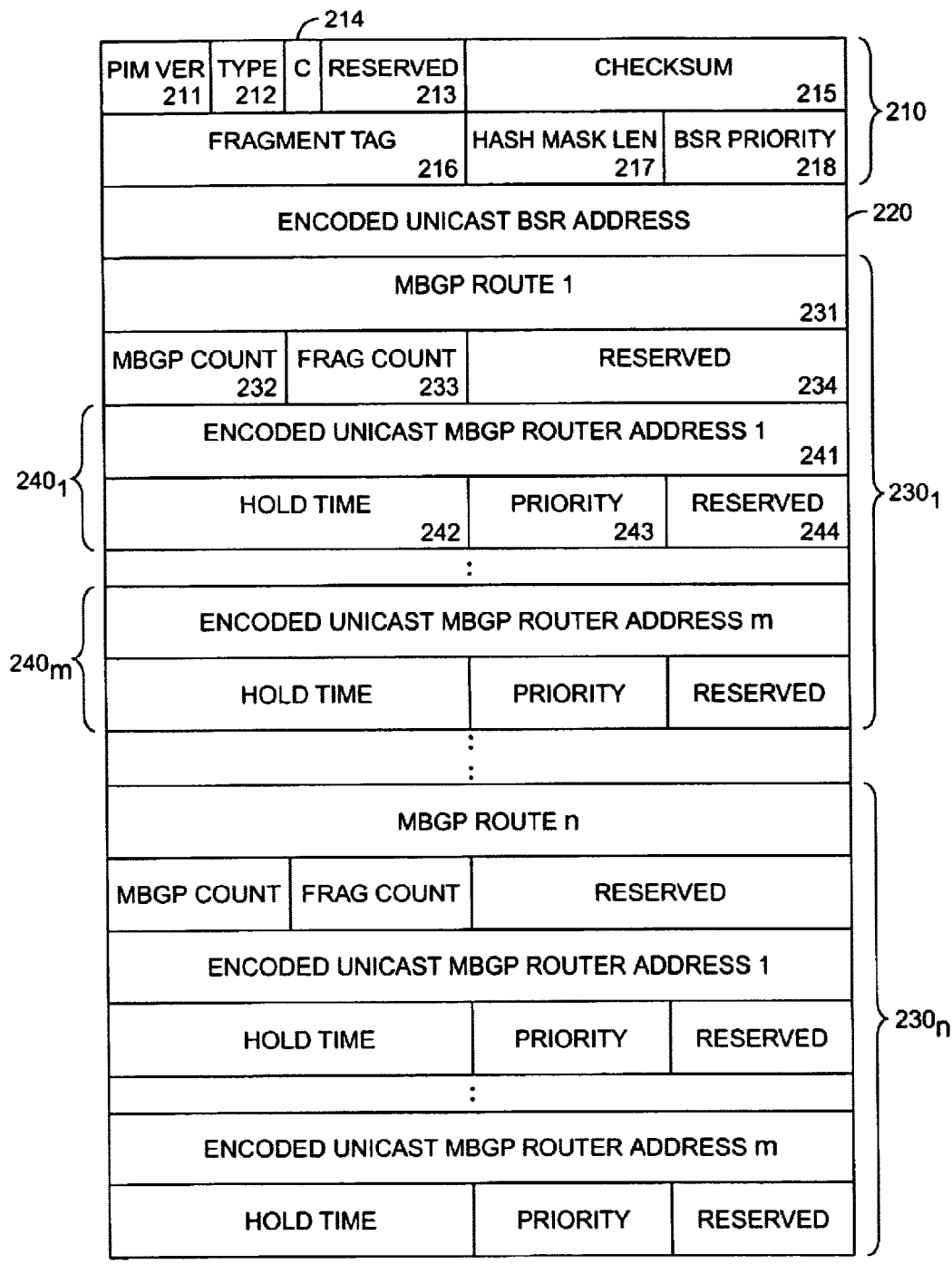
FIG. 2 is a block diagram showing the format of a MBGP Boostrap message in accordance with an embodiment of the present invention.

FIG. 2 is a block diagram showing the format of a preferred MBGP Bootstrap message 200. The preferred MBGP Bootstrap message includes a PIM message header 210, a BSR address 220, and a number of MBGP route blocks 230₁ through 230ₙ. The PIM message header 210 includes a PIM Version field 211, a Type field 212, a Reserved field 213, a Change field 214, a Checksum field 215, a Fragment Tag field 216, a Hash Mask Length field 217, and a BSR Priority field 218. Except for the Change field 214, the fields in the PIM message header 210 are identical to the corresponding fields in a PIM Bootstrap message. The Change field 214 is used to indicate whether the MBGP Bootstrap message 200, and particularly the MBGP routes represented by the MBGP route blocks 230₁ through 230ₙ, includes only changed MBGP routes.

The BSR Address 220 includes the address of the BSR.

Each BGMP route block 230 includes a MBGP Route field 231, a MBGP Count field 232, a Fragment Count field 233, a Reserved field 234, and a number of MBGP Router blocks 240₁ through 240ₘ. The MBGP Route field 231 is used to indicate a MBGP route. The MBGP Count field indicates the number of MBGP Router blocks that are associated with the MBGP route. The Fragment Count field 231 is identical to the corresponding field in the PIM Bootstrap message.

Each MBGP Router block 240 includes a MBGP Router Address field 241, a Holdtime field 242, a Priority field 243, and a Reserved field 244. The MBGP Router address field 214 is used to indicate the address of a MBGP router. The Holdtime field 242 and the Priority field 243 are identical to the corresponding fields in the PIM Bootstrap message.

Figure 3A:
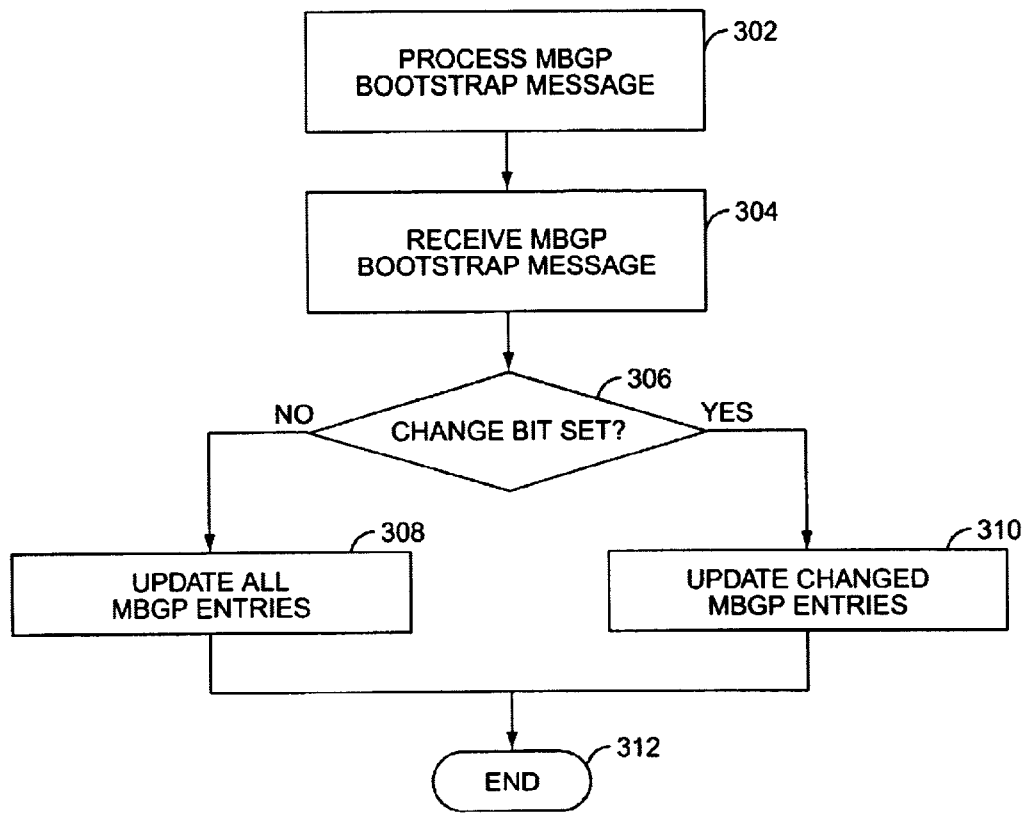
FIG. 3A is a logic flow diagram showing exemplary logic for processing a MBGP Bootstrap message by a PIM router in accordance with an embodiment of the present invention.

FIG. 3A is a logic flow diagram showing exemplary logic for processing a MBGP Bootstrap message by a PIM router. Beginning at step 302, and upon receiving the MBGP Bootstrap message, in step 304, the logic first checks the Change bit 214 to determine whether the MBGP Bootstrap message includes all MBGP routes or only changed MBGP routes. In a preferred embodiment, the BSR sets the Change bit 214 to the binary value zero to indicate that the MBGP Bootstrap message includes all MBGP routes and to the binary value one to indicate that the MBGP Bootstrap message includes only changed MBGP routes. If the Change bit 214 indicates that the MBGP Bootstrap message includes all MBGP routes (NO in step 306), then the logic updates all MBGP entries based upon the MBGP routes included in the MBGP Bootstrap message, in step 308. If the Change bit 214 indicates that the MBGP Bootstrap message includes only changed MBGP routes (YES in step 306), then the logic updates only the changed MBGP entries based upon the MBGP routes included in the MBGP Bootstrap message, in step 310. The logic terminates in step 312.

Figure 3B:
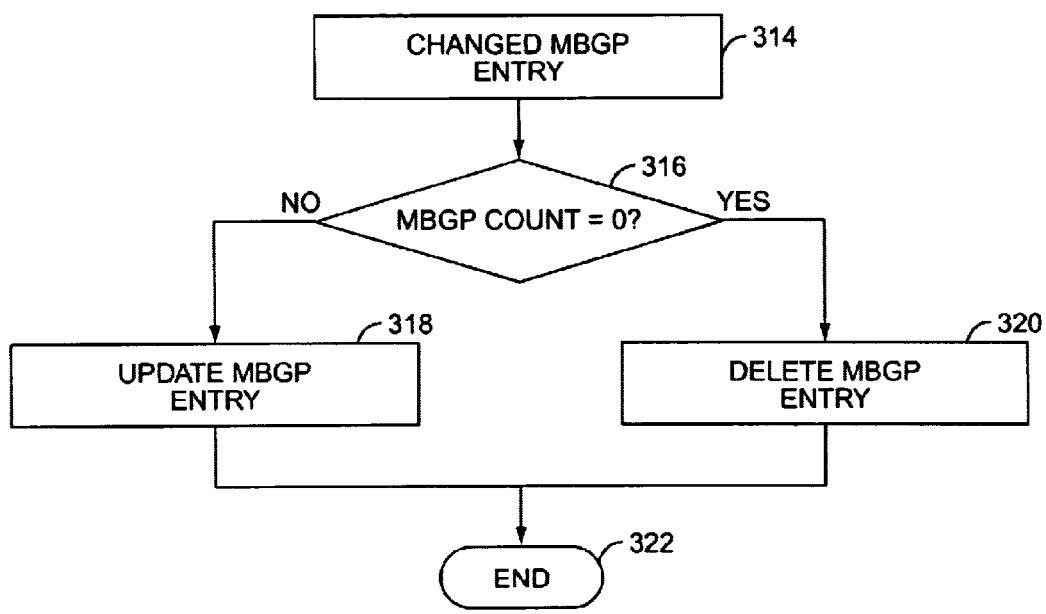
FIG. 3B is a logic flow diagram showing exemplary logic for updating a changed MBGP entry based upon routing information in the MBGP Bootstrap message in accordance with an embodiment of the present invention.

FIG. 3B is a logic flow diagram showing exemplary logic for updating a changed MBGP entry based upon a MBGP route block 230 from the MBGP Bootstrap message. If the corresponding MBGP route is associated with at least one MBGP router, then the MBGP route is still active, and the logic updates the MBGP route in the MRIB to include each MBGP router identified in the MBGP route block 230. However, if the corresponding MBGP route is not associated with any MBGP router, then the MBGP route is obsolete (i.e., aged), and the logic deletes the MBGP entry from the MRIB. Therefore, beginning in step 314, the logic first determines the number of MBGP routers that are associated with a MBGP route 231 based upon the MBGP Count field 232 in the MBGP route block 230, in step 316. If the MBGP Count field 232 is greater than zero (NO in step 316), indicating that the MBGP route is associated with at least one MBGP router, then the logic proceeds to update the corresponding MBGP entry in the MRIB, in step 318. IF the MBGP Count field 232 is equal to zero (YES in step 316), indicating that the MBGP route is not associated with any MBGP router, then the logic proceeds to delete the corresponding MBGP entry from the MRIB, in step 320. This procedure is performed for each MBGP route 231 included in the MBGP Bootstrap message. The logic terminates in step 322.

The BSR may also be configured with any policy routes for the PIM domain. The BSR distributes the policy routes to all PIM routers in the PIM domain by sending a Policy Bootstrap message including the policy routes. Whenever the BSR determines that one or more policy routes have changed, the BSR distributes the changed policy route(s) to all PIM routers in the PIM domain by sending a Policy Bootstrap message including only the changed policy route (s). The BSR sends the Policy Bootstrap messages to each of its neighboring PIM routers. Each PIM router in turn sends the Policy Bootstrap message to each of its neighboring PIM routers, so that the Policy Bootstrap messages are propagated to all PIM routers in the PIM domain.

A PIM router is required to perform a Reverse Path Forwarding (RPF) check whenever it sends a PIM Join/Prune message towards a RP router or a multicast source, and is also required to perform a RPF check when it receives a multicast packet from a RP router or a multicast source. If the RPF check relates to a RP router, then the PIM router searches its MRIB for the particular multicast group in order to determine the RP router, and then searches its URIB for the RP router in order to determine the RPF interface and its upstream neighbor. If the RPF check relates to a multicast source, then the PIM router searches its MRIB for the multicast source. If the multicast source is associated with a MBGP entry, then the PIM router determines the "preferred" MBGP router, and searches its URIB for the "preferred" MBGP router in order to determine the RPF interface and its upstream neighbor. Otherwise, the PIM router searches its URIB for the multicast source in order to determine the RPF interface and its upstream neighbor.

Figure 4A:
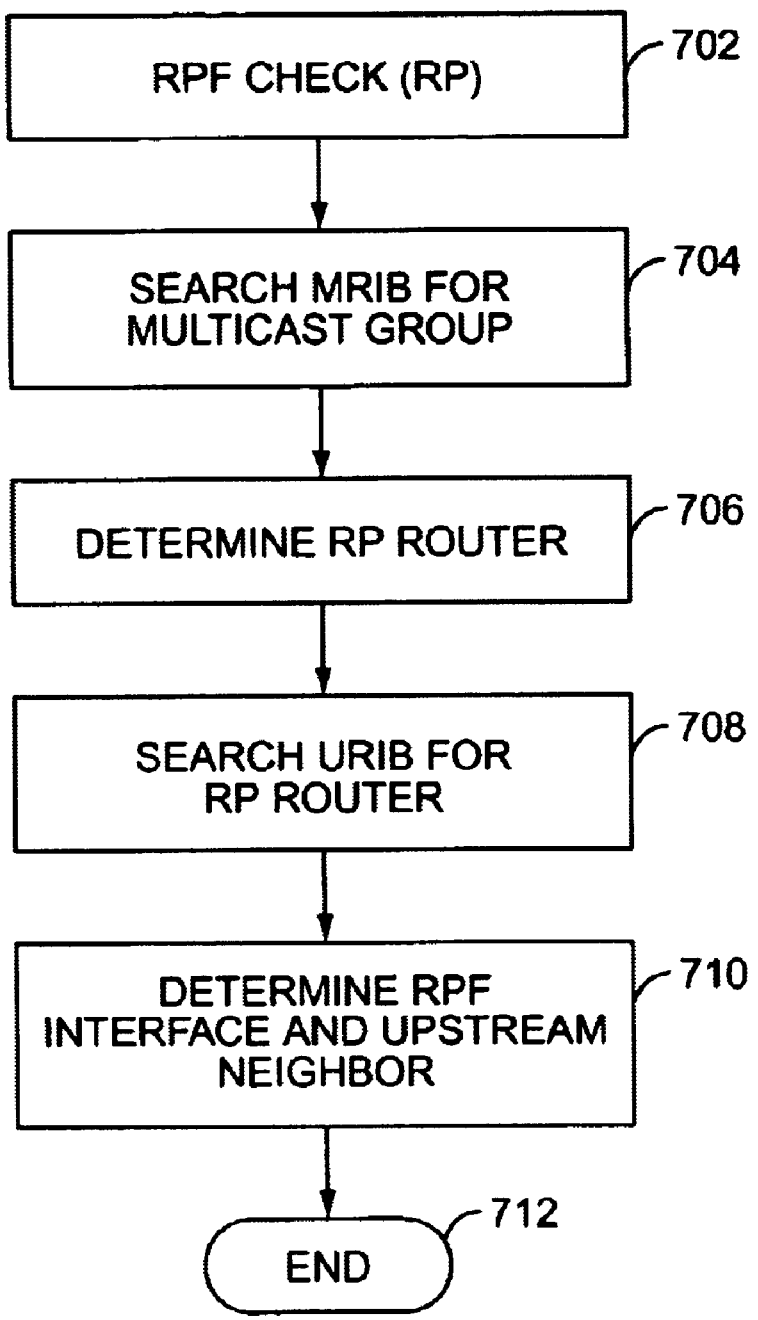
FIG. 4A is a logic flow diagram showing exemplary PIM router logic for performing a RPF check relating to a RP router in accordance with an embodiment of the present invention.

FIG. 4A is a logic flow diagram showing exemplary PIM router logic for performing a RPF check relating to a RP router. Beginning in step 702, the logic first searches the MRIB for the multicast group, in step 704, and determines the RP router, in step 706. The logic then searches the URIB for the RP router, in step 708, and determines the RPF interface and its upstream neighbor, in step 710. The logic terminates in step 712.

Figure 4B:
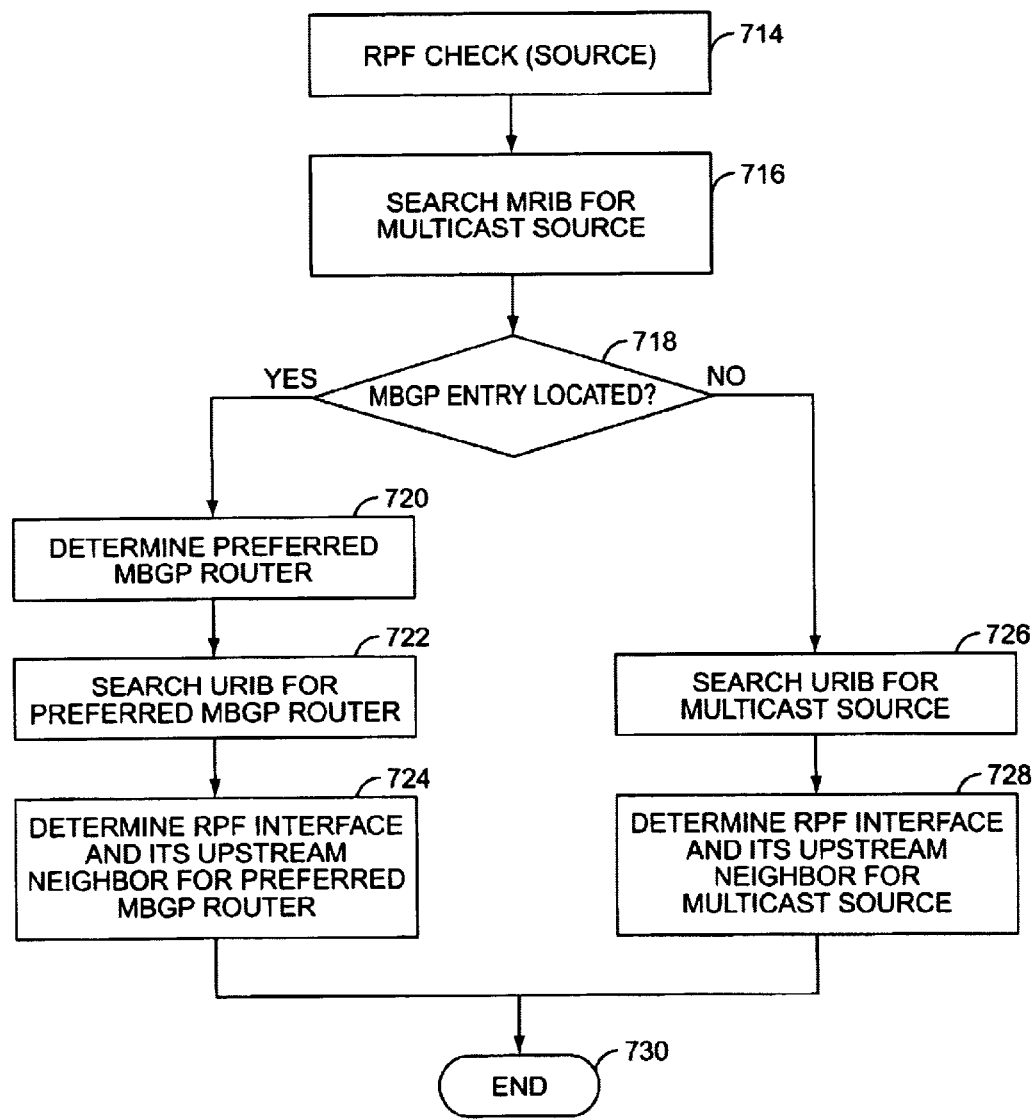
FIG. 4B is a logic flow diagram showing exemplary PIM router logic for performing a RPF check relating to a multicast source in accordance with an embodiment of the present invention.

FIG. 4B is a logic flow diagram showing exemplary PIM router logic for performing a RPF check relating to a multicast source. Beginning in step 714, the logic first searches the MRIB for the multicast source, in step 716. If the multicast source is associated with a MBGP entry (YES in step 718), then the logic determines the "preferred" MBGP router, in step 720, searches the URIB for the "preferred" MBGP router, in step 722, and determines the RPF interface and its upstream neighbor, in step 724. If the multicast source is not associated with a MBGP entry (NO in step 718), then the logic searches the URIB for the multicast source, in step 726, and determines the RPF interface and its upstream neighbor, in step 728. The logic terminates in step 730.

Figure 5:
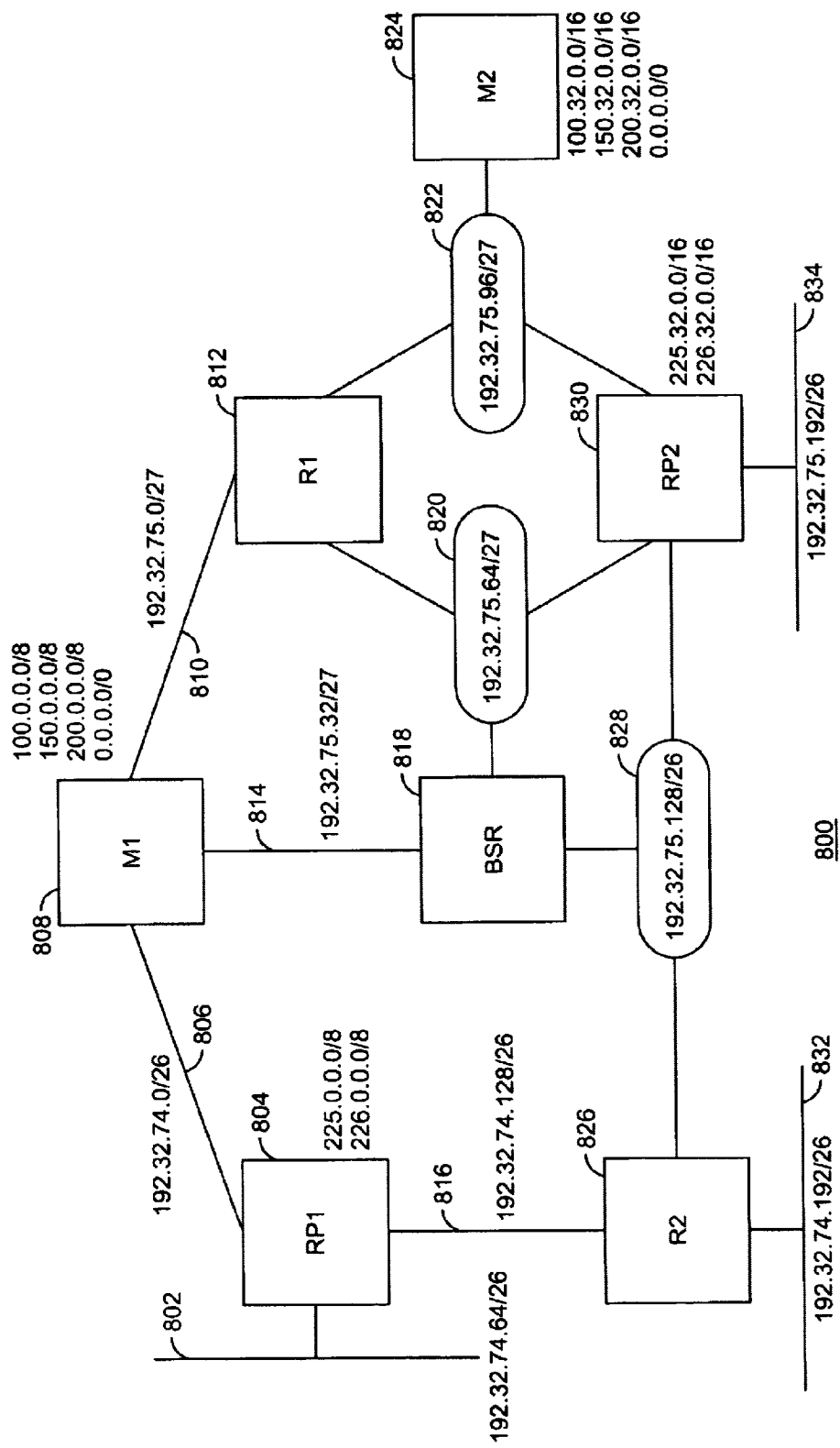
FIG. 5 is a block diagram showing an exemplary PIM network in accordance with an embodiment of the present invention.

Various elements of the present invention can be demonstrated by example. FIG. 5 shows an exemplary PIM network 800. The exemplary PIM network 800 includes a number of interconnected routers. Specifically, the exemplary PIM network 800 includes a Bootstrap Router BSR (818), two MBGP routers M1 (808) and M2 (824), two RP routers RP1 (804) and RP2 (830), and two other routers R1 (812) and R2 (826). In the discussion that follows, networks and routes are identified by a source address and a mask, and are shown in the form X.X.X.X/Y, where X.X.X.X is the source address and Y is a prefix indicating the mask length (in bits). Also in the discussion that follows, the MBGP router M2 (824) has a higher priority than the MBGP router M1 (808), and the RP router RP2 (830) has a higher priority than the RP router RP1 (804).

The MBGP router M1 (808) has four (4) MBGP routes, specifically 100.0.0.0/8, 150.0.0.0/8, 200.0.0.0/8, and a default MBGP route 0.0.0.0/0. The MBGP router M1 (808) is coupled to the RP router RP1 (804) via network 192.32.74.0/26 (806). The MBGP router M1 (808) is coupled to the router R1 (812) via network 192.32.75.0/27 (810). The MBGP router M1 (808) is coupled to the Bootstrap Router BSR (818) via network 192.32.75.32/27 (814).

The RP router RP1 (804) is responsible for two group routes, specifically group routes 225.0.0.0/8 and 226.0.0.0/8. The RP router RP1 (804) supports a directly connected network 192.32.74.64/26 (802). The RP router RP1 (804) is coupled to the MBGP router M1 (808) via the network 192.32.74.0/26 (806). The RP router RP1 (804) is coupled to the router R2 (826) via a network 192.32.74.128/26 (816).

The router R2 (826) supports a directly connected network 192.32.74.192/26 (832). The router R2 (826) is coupled to the RP router RP1 (804) via the network 192.32.74.128/26 (816). The router R2 (826) is coupled to both the Bootstrap Router BSR (818) and the RP router RP2 (830) via a network 192.32.75.128/26 (828).

The Bootstrap Router BSR (818) is coupled to the MBGP router M1 (808) via the network 192.32.75.32/27 (814). The Bootstrap Router BSR (818) is coupled to both the router R2 (826) and the RP router RP2 (830) via the network 192.32.75.128/26 (828). The Bootstrap Router BSR (818) is coupled to both the router R1 (812) and the RP router RP2 (830) via a network 192.32.75.64/27 (820).

The router R1 (812) is coupled to the MBGP router M1 (808) via the network 192.32.75.0/27 (810). The router R1 (812) is coupled to both the Bootstrap Router BSR (818) and the RP router RP2 (830) via the network 192.32.75.64/27 (820). The router R1 (812) is coupled to both the MBGP router M2 (824) and the RP router RP2 (830) via a network 192.32.75.96/27 (822).

The RP router RP2 (830) is responsible for two group routes, specifically group routes 225.32.0.0/16 and 225.32.0.0/16. The group routes 225.32.0.0/16 and 226.32.0.0/16 associated with the RP router RP2 (830) are more specific than the group routes 225.0.0.0/8 and 226.0.0.0/8 associated with the RP router RP1 (804). The RP router RP2 supports a directly connected network 192.32.75.192/26 (834). The RP router RP2 (830) is coupled to both the router R2 (826) and the Bootstrap Router BSR (818) via the network 192.32.75.128/26 (828). The RP router RP2 (830) is coupled to both the Bootstrap Router BSR (818) and the router R1 (812) via the network 192.32.75.64/27 (820). The RP router RP2 (830) is coupled to both the MBGP router M2 (824) and the router R1 (812) via the network 192.32.75.96/27 (822).

The MBGP router M2 (824) has four (4) MBGP routes, specifically 100.32.0.0/16, 150.32.0.0/16, 200.32.0.0/16, and a default MBGP route 0.0.0.0/0. The MBGP routes 100.32.0.0/16, 150.32.0.0/16, 200.32.0.0/16 associated with the MBGP router M2 (824) are more specific than the corresponding MBGP routes 100.0.0.0/8, 150.0.0.0/8, 200.0.0.0/8 associated with the MBGP router M1 (808). The MBGP router M2 (824) is coupled to both the router R1 (812) and the RP router RP2 (830) via the network 192.32.75.96/27 (822).

In order to route packets, each router determines a "next hop" for each packet based upon address information in the packet. Specifically, each router runs a routing protocol that determines, among other things, the outgoing interface(s) associated with a particular address. Each router maintains a URIB that is used to determine the "next hop" for unicast packets. Each multicast router also maintains a MRIB that is used to determine the "next hop" for multicast packets. Upon receiving a packet, the router searches the appropriate routing information base for the outgoing interface(s) associated with the packet, and, assuming the router decides to forward the packet, routes the packet over the specified outgoing interface(s).

In the absence of any multicast routing protocol for supplying multicast routes, the MRIB contains two (2) types of entries, namely MBGP entries and group entries.

A MBGP entry is used to determine the next MBGP router towards a particular MBGP route. It is associated with one or a list of MBGP routers. If the MBGP entry is associated with a list of MBGP routers, then one of the routers is considered to be "preferred." The "preferred" MBGP router is determined using a priority scheme as described in the document Internet Engineering Task Force (IETF) Request For Comments (RFC) 2362 entitled *Protocol Independent Multicast-Sparse Mode (PIM-SM): Protocol Specification*, which was incorporated by reference above. Only one MBGP router is "preferred" when a PIM router performs a Reverse Path Forwarding (RPF) check, although another MBGP router can be activated when the "preferred" MBGP router is unavailable.

A group entry is used to determine the next RP router towards a particular group range. It is associated with one or a list of RP routers. If the group entry is associated with a list of RP routers, then one of the RP routers is considered to be "preferred." The "preferred" RP router is determined using a hash function, where the RP router with the highest hash value is "preferred." A PIM router sends a PIM Join/Prune message for a (*,G) state towards the "preferred" RP router. Another RP router can be activated when the "preferred" RP router is unavailable.

Figure 6:
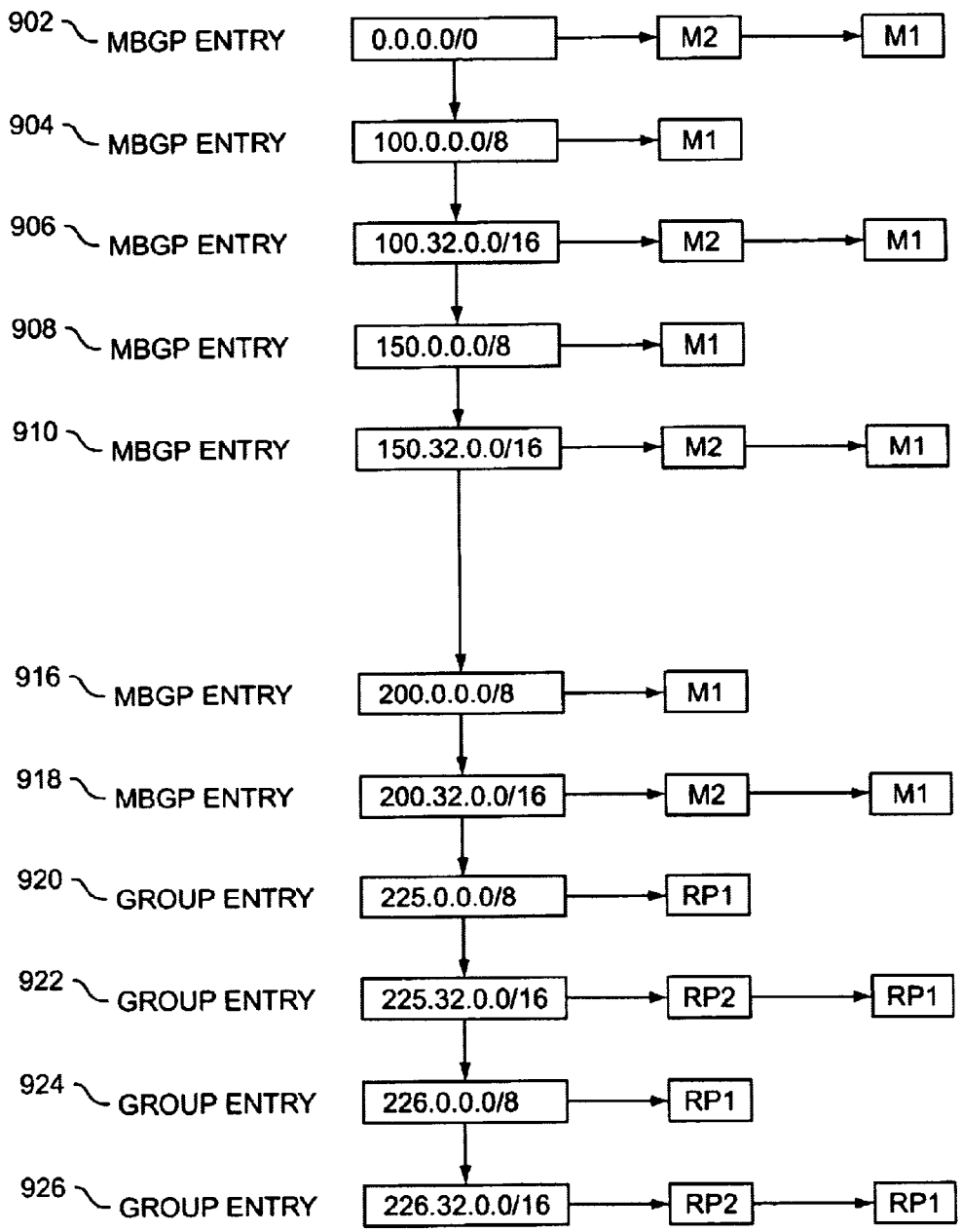
FIG. 6 is a block diagram showing an exemplary multicast routing information base in accordance with an embodiment of the present invention.

Referring again to FIG. 5, the BSR (818) opens a TCP connection to the MBGP routers M1 (808) and M2 (824). The BSR (818) obtains the MBGP routes 100.0.0.0/8, 150.0.0.0/8, 200.0.0.0/8, and 0.0.0.0/0 from the MBGP router M1 (808), and obtains the MBGP routes 100.32.0.0/16, 150.32.0.0/16, 200.32.0.0/16, and 0.0.0.0/0 from the MBGP router M2 (824). The MBGP routes 100.0.0.0/8, 150.0.0.0/8, and 200.0.0.0/8 are associated with only the MBGP router M1 (808). The more specific MBGP routes 100.32.0.0/16, 150.32.0.0/16, and 200.32.0.0/16, as well as the default MBGP route 0.0.0.0/0, are associated with both the MBGP router M1 (808) and the MBGP router M2 (824), although the MBGP router M2 (824) is the "preferred" MBGP router, since the MBGP router M2 (824) has a higher priority than the MBGP router M1 (808). The BSR (818) adds the appropriate MBGP entries into its MRIB as shown in FIG. 6, namely MBGP entries 902, 904, 906, 908, 910, 916, and 918.

After obtaining the MBGP routes from the MBGP router M1 (808) and the MBGP router M2 (824), the BSR (818) sends a MBGP Bootstrap message containing all of the MBGP routes, specifically the MBGP routes 0.0.0.0/0, 100.0.0.0/8, 100.32.0.0/16, 150.0.0.0/8, 150.32.0.0/16, 200.0.0.0/8, and 200.32.0.0/16. The MBGP Bootstrap message is propagated to all PIM routers in the PIM domain. Each PIM router updates its MRIB to include the MBGP routes, and therefore each PIM router includes the MBGP entries 902, 904, 906, 908, 910, 916, and 918 in its MRIB.

Thereafter, the BSR (818) periodically sends a MBGP Bootstrap message containing all of the MBGP routes. Each PIM router verifies that its MRIB includes the correct entries for all of the MBGP routes. Periodically sending a MBGP Bootstrap message containing all of the MBGP router allows any newly activated PIM router to "learn" the MBGP routes.

Also, when the BSR (818) determines that one or more MBGP routes have changed, the BSR (818) may send a MBGP Bootstrap message containing only the changed MBGP routes. Each PIM router updates its MRIB to include the changed MBGP routes.

Additionally, the BSR (818) participates in PIM protocol exchanges with other PIM routers in the PIM domain, and learns group routes via PIM Candidate RP Advertisement messages. The BSR (818) learns the group routes 225.0.0.0/8 and 226.0.0.0/8 from the RP router RP1 (804), and learns the group routes 225.32.0.0/16 and 226.32.0.0/16 from the RP router RP2 (830). The group routes 225.0.0.0/8 and 226.0.0.0/8 are associated with only the RP router RP1 (804). The more specific group routes 225.32.0.0/16 and 226.32.0.0/16 are associated with both the RP router RP1 (804) and the RP router RP2 (830), although the RP router RP2 (830) is the "preferred" RP router, since the RP router RP2 (830) has a higher priority than the RP router RP1 (804). The BSR (818) adds the appropriate group entries into its MRIB as shown in FIG. 6, namely group entries 920, 922, 924, and 926.

In a preferred embodiment of the present invention, predominantly all of the logic for collecting multicast routing information, distributing multicast routing information, and maintaining multicast routing information in the MRIB is implemented as a set of computer program instructions that are stored in a computer readable medium and executed by an embedded microprocessor system within the router. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product maybe distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Thus, the present invention may be embodied as a method for distributing multicast routing information over a PIM domain. The PIM domain includes a plurality of interconnected PIM devices and a plurality of border devices. The method involves selecting a bootstrap device from among the plurality of PIM devices, collecting interdomain multicast routing information from the plurality of border devices by the bootstrap device, and distributing the interdomain multicast routing information over the PIM domain. Collecting multicast routes from the plurality of border devices involves, for each border device, opening a communication connection, such as a TCP connection, to the border device and obtaining the interdomain multicast routing information from the border device over the communication connection, for example, using an interior routing protocol such as IBGP. Distributing the interdomain multicast routing information over the PIM domain involves including the interdomain multicast routing information in a bootstrap message and propagating the bootstrap message over the PIM domain. Distributing the interdomain multicast routing information over the PIM domain may also involve including only changed interdomain multicast routing information in a bootstrap message having a change indicator, and propagating the bootstrap message over the PIM domain.

The present invention may also be embodied as a device for distributing multicast routing information over a PIM domain. The PIM domain includes a plurality of border devices. The device includes route collection logic for collecting interdomain multicast routing information from the plurality of border devices and route distribution logic for distributing the interdomain multicast routing information over the PIM domain. The route collection logic includes connection control logic for opening a communication connection, such as a TCP connection, to a border device, and also includes routing protocol logic for obtaining the interdomain multicast routing information from the border device over the communication connection using an interior routing protocol, such as IBGP. The route distribution logic includes bootstrap logic for sending a bootstrap message including the interdomain multicast routing information and for sending a bootstrap message including changed interdomain multicast routing information and a change indicator.

The present invention may also be embodied in a computer program having route collection logic programmed to collect interdomain multicast routing information from the plurality of border devices and route distribution logic programmed to distribute the interdomain multicast routing information over the PIM domain. The route collection logic includes connection control logic for opening a communication connection, such as a TCP connection to a border device, and also includes routing protocol logic for obtaining the interdomain multicast routing information from the border device over the communication connection using an interior routing protocol, such as IBGP. The route distribution logic includes bootstrap logic for sending a bootstrap message including the interdomain multicast routing information and for sending a bootstrap message including changed interdomain multicast routing information and a change indicator.

The present invention may also be embodied as a data signal having embodied therein a protocol message for distributing multicast routing information. The protocol message includes, among other things, a protocol message header indicating that the protocol message includes multicast routing information, a bootstrap router address, a multicast route, and a multicast router address associated with the multicast route.

The present invention may also be embodied as a method for distributing multicast routing information in a communication system. The method involves maintaining interdomain multicast routing information by a number of border devices, collecting the interdomain multicast routing information from the number of border devices by a bootstrap device, sending the interdomain multicast routing information by the bootstrap device to a number of protocol independent multicast devices in the communication network, and updating, by each protocol independent multicast device that receives the interdomain multicast routing information, a multicast routing information base to include the interdomain multicast routing information.

The present invention may be embodied in other specific forms without departing from the essence or essential characteristics. The described embodiments are to be considered in all respects only as illustrative and not restrictive.

We claim:

1. A method for distributing multicast routing information over a protocol independent multicast domain, the protocol independent multicast domain including a plurality of interconnected protocol independent multicast devices and a plurality of border devices, the method comprising:

selecting from among the plurality of protocol independent multicasts devices a bootstrap device for the protocol independent multicast domain;

collecting interdomain multicast routing information from the plurality of border devices by the bootstrap device, said interdomain multicast routing information comprising routing information for routes that span between the protocol independent multicast domain and another protocol independent multicast domain; and distributing by the bootstrap device the interdomain multicast routing information over the protocol independent multicast domain.

2. The method of claim 1, wherein collecting interdomain multicast routing information from the plurality of border devices comprises, for each border device:

opening a communication connection to the border device; and obtaining the interdomain multicast routing information from the border device over the communication connection.

3. The method of claim 2, wherein opening a communication connection to the border device comprises opening a Transmission Control Protocol connection to the border device.

4. The method of claim 2, wherein obtaining the interdomain multicast routing information from the border device over the communication connection comprises utilizing an interior routing protocol to obtain the interdomain multicast routing information.

5. The method of claim 4, wherein the interior routing protocol is an Interior Border Gateway Protocol.

6. The method of claim 1, wherein distributing the interdomain multicast routing information over the protocol independent multicast domain comprises:

including bootstrap router information and the interdomain multicast routing information in a bootstrap message; and propagating the bootstrap message over the protocol independent multicast domain.

7. The method of claim 1, wherein distributing the interdomain multicast routing information over the protocol independent multicast domain comprises:

including bootstrap router information and changed interdomain multicast routing information in a bootstrap message, the bootstrap message including a change indicator; and propagating the bootstrap message over the protocol independent multicast domain.

8. A device for distributing multicast routing information over a protocol independent multicast domain, the protocol independent multicast domain including a plurality of border devices, the device comprising:

route collection logic operably coupled to collect interdomain multicast routing information from the plurality of border devices, said interdomain multicast routing information comprising routing information for routes that span between the protocol independent multicast domain and another protocol independent multicast domain; and route distribution logic operably coupled to distribute the interdomain multicast routing information over the protocol independent multicast domain;

wherein the route distribution logic comprises bootstrap logic operably coupled to send a bootstrap message including bootstrap router information and the interdomain multicast routing information.

9. The device of claim 8, wherein the route collection logic comprises:

connection control logic operably coupled to open a communication connection to a border device; and routing protocol logic operably coupled to obtain the interdomain multicast routing information from the border device over the communication connection.

10. The device of claim 8, wherein the connection logic comprises Transmission Control Protocol logic, and wherein the routing protocol logic comprises an Interior Border Gateway Protocol.

11. The device of claim 8, wherein the route distribution logic comprises bootstrap logic operably coupled to send a bootstrap message including changed interdomain multicast routing information and further including a change indicator.

12. A program product comprising a computer readable medium having embodied therein a computer program for distributing multicast routing information over a protocol independent multicast domain, the protocol independent multicast domain including a plurality of interconnected protocol independent multicast devices and a plurality of border devices, the computer program comprising:

route collection logic programmed to collect interdomain multicast routing information from the plurality of border devices, said interdomain multicast routing information comprising routing information for routes that span between the protocol independent multicast domain and another protocol independent multicast domain; and route distribution logic programmed to distribute the interdomain multicast routing information over the protocol independent multicast domain;

wherein the route distribution logic comprises bootstrap logic programmed to send a bootstrap message including bootstrap router information and the interdomain multicast routing information.

13. The program product of claim 12, wherein the route collection logic comprises:

connection control logic programmed to open a communication connection to a border device; and routing protocol logic programmed to obtain the interdomain multicast routing information from the border device over the communication connection.

14. The program product of claim 13, wherein the connection control logic comprises Transmission Control Protocol logic, and wherein the routing protocol logic comprises an Interior Border Gateway Protocol.

15. The program product of claim 12, wherein the route distribution logic comprises bootstrap logic programmed to send a bootstrap message including changed interdomain multicast routing information and further including a change indicator.

16. A data signal having embodied therein a protocol message for distributing interdomain multicast routing information, the protocol message comprising:

a protocol message header containing an address of a bootstrap router that generated the protocol message header and indicating that the protocol message includes interdomain multicast routing information; and at least one BGMP route block, wherein each MBGP route block comprises the interdomain multicast routing information, said interdomain multicast routing information comprising routing information from routes that span a first protocol independent multicast domain and a second protocol independent multicast domain.

17. The data signal of claim 16, wherein the protocol message header comprises a change indicator indicating that the protocol message identifies all MBGP routes.

18. The data signal of claims 16, wherein the protocol message header comprises a change indicator that the protocol message identifies only changed MBGP routes.

19. In a communication system having a plurality of interconnected communication devices, a method for distributing multicast routing information, the method comprising:

maintaining interdomain multicast routing information by a number of border devices, said interdomain multicast routing information comprising routing information for routes that span between the protocol independent multicast domain and another protocol independent multicast domain;

collecting the interdomain multicast routing information from the number of border devices by a bootstrap device;

sending the interdomain multicast routing information in a bootstrap message by the bootstrap device to a number of protocol independent multicast devices in the communication network; and updating, by each protocol independent multicast device that receives the interdomain multicast routing information, a multicast routing information base to include the interdomain multicast routing information.

20. The method of claim 19, wherein sending the interdomain multicast routing information by the bootstrap device to the number of protocol independent multicast devices in the communication network comprises sending a bootstrap message containing all MBGP routes.

21. The method of claim 19, wherein sending the interdomain multicast routing information by the bootstrap device to the number of protocol independent multicast devices in the communication network comprises sending a bootstrap message containing only changed MBGP routes.

22. The method of claim 19, wherein collecting the interdomain multicast routing information from the number of border devices by the bootstrap device comprises:

opening a Transmission Control Protocol connection to each border device; and using a BGP mechanism to obtain MBGP routes from each border device over the corresponding Transmission Control Protocol connection.

\* \* \* \* \*